(12) United States Patent
Cooper (10) Patent No.: US 9,150,066 B1
(45) Date of Patent: Oct. 6, 2015

(54) RESILIENT TOWING DEVICE FOR TOWING RECEPTACLES

(71) Applicant: Kenneth S. Cooper, Klamath Falls, OR (US)

(72) Inventor: Kenneth S. Cooper, Klamath Falls, OR (US)

( * ) Notice: Subject to any disclaimer, the term of this patent is extended or adjusted under 35 U.S.C. 154(b) by 0 days.

(21) Appl. No.: 14/795,315

(22) Filed: Jul. 9, 2015

Related U.S. Application Data (60) Provisional application No. 62/064,319, filed on Oct. 15, 2014.

(51) Int. Cl.
| | |
|---|---|
| *B60R 9/06* | (2006.01) |
| *B60D 1/14* | (2006.01) |
| *B60D 1/18* | (2006.01) |
| *B60D 1/52* | (2006.01) |
| *B65F 1/14* | (2006.01) |

(52) U.S. Cl.
CPC .............. *B60D 1/182* (2013.01); *B60D 1/187* (2013.01); *B60D 1/52* (2013.01); *B60D 1/14* (2013.01); *B60R 9/06* (2013.01); *B65F 1/1468* (2013.01)

(58) Field of Classification Search
CPC ............ B60R 9/06; B65F 1/1468; B60D 1/14
See application file for complete search history.

(56) References Cited

U.S. PATENT DOCUMENTS

| | | | | |
|---|---|---|---|---|
| D507,688 S | * | 7/2005 | Jean | ............... D34/10 |
| 7,217,078 B2 | | 5/2007 | Short | |
| D579,739 S | * | 11/2008 | Barone | ............. D8/14 |
| 8,162,192 B1 | * | 4/2012 | Sanchez | ........... B60D 1/155 224/521 |
| D665,641 S | * | 8/2012 | Raleigh | ............... D34/10 |
| 8,505,951 B2 | | 8/2013 | Bohse | |
| 8,550,318 B2 | | 10/2013 | Tortumul | |
| D703,410 S | * | 4/2014 | Sisko | ............... D34/10 |
| 9,085,207 B1 | * | 7/2015 | Sweet | ........... B60D 1/24 1/1 |
| 2004/0164517 A1 | * | 8/2004 | Lewy et al. | ........ B60D 1/145 280/493 |
| 2007/0080181 A1 | * | 4/2007 | Lynch | ........... A47G 25/005 223/85 |

FOREIGN PATENT DOCUMENTS

| | | | | |
|---|---|---|---|---|
| AU | WO 2004052665 A1 | * | 6/2004 | ............ B60D 1/00 |
| AU | 2007100062 A4 | | 3/2007 | |
| GB | 2275035 A | | 8/1994 | |
| GB | 2430422 A | * | 3/2007 | ............ B60D 1/00 |

* cited by examiner

*Primary Examiner* — Justin Larson
(74) *Attorney, Agent, or Firm* — Jerry Haynes Law (57) ABSTRACT

A resilient towing device connects a receptacle to a towing vehicle while reducing the longitudinal forces exerted on the receptacle when a momentum of the towing vehicle differs from a momentum of the receptacle. A pair of spaced apart rods has a hitch end, a middle region, and a receptacle end. The hitch end forms a hook having an opening. The hook and/or the opening may be used to hitch on to a tow hitch from a towing vehicle. The middle region includes a support portion that may be used to support a receptacle handle. The support portion may include a U-shape that is sized and dimensioned to receive and support a receptacle handle. A receptacle end of the rods forms a pair of arcs that extends upwardly and away from the middle region, pressing down on a receptacle lid.

20 Claims, 5 Drawing Sheets

RESILIENT TOWING DEVICE FOR TOWING RECEPTACLES

CROSS-REFERENCES TO RELATED APPLICATIONS

This application claims priority from U.S. Provisional Application Ser. No. 62/064,319, entitled "Resilient Towing Device for Towing Receptacles", filed Oct. 14, 2014, which application is hereby incorporated herein by reference in its entirety.

FIELD OF THE INVENTION

The present invention relates generally to a towing device for towing receptacles and more particularly it relates to a resilient towing device for towing one or more wheeled receptacles while dampening longitudinal and oscillating forces on the receptacles.

BACKGROUND OF THE INVENTION

Currently wheeled trash receptacles have been widely integrated into all segments of waste collection. The wheeled aspect of the trash receptacle is important, as this allows the trash collector to tip the trash receptacle back onto the wheels, and roll it from its usual location to the curb for pick up by a trash collection truck.

Typically, commercially available wheeled trash bins are elongate and upright. It is known in the art that the elongate upright profile of the trash receptacle generally is one that creates a relatively high center of gravity that enables the trash receptacle to be tipped for carrying. Often, the contents of the trash receptacle are too heavy to pull. Additionally, multiple trash receptacles may require towing. This operation can be too cumbersome for one person. In many instances, a vehicle with a hitch can be used. Unfortunately, longitudinal and oscillation forces may cause the contents of the trash receptacle to fall out, or the generally elongated trash receptacle to tip over.

Thus there is a need for a simple towing device that could be utilized to tow the trash receptacle behind the vehicle while dampening longitudinal and oscillating forces acting on the trash receptacle.

Numerous innovations for towing one or multiple conventional wheeled trash cans, trash bins, trash carts or trash receptacles with hinged lids have been provided in the prior art as described below. Even though these innovations may be suitable for the specific purposes to which they address, however, they differ from the present invention.

U.S. Pat. No. 8,550,318 to Tortumlu, teaches a simple bracket for towing single and multiple trash bins behind a vehicle, wherein the bracket is made up of rigid metal sheet. It does not, however, teach a resilient towing device for towing one or more trash bins while dampening longitudinal and oscillating forces on the trash bins, further Tortumlu fails to teach several other advantages and improvements of the present invention.

U.S. Pat. No. 8,505,951 to Bohse, describes a device mountable on a conventional trailer hitch for lifting and carrying a typical household waste container or a trash receptacle by carrying the receptacle behind a motor vehicle, wherein the device includes a hitch bar with an opening there through for mounting in a standard hitch receiver on the vehicle using a locking pin. It does not teach, however, a resilient towing device for towing one or more trash receptacles while dampening longitudinal and oscillating forces on the trash receptacles as well as the present invention is designed as a unitary device, having no moving parts, thereby it is easy to mount, manufacture and transport and it requires no maintenance at all. Further Bohse fails to describe several other advantages and improvements of the present invention.

G.B. Patent Office Document No. 2,275,035 to Mcgreevy, teaches a load-carrying attachment to be securable to the rear of a vehicle and is for use in transporting wheeled bins or receptacles, wherein the attachment comprising an elongate member having at one end a hitching mechanism securable to the vehicle and at the opposite end a gripping means comprising at least two hooks to engage around the bar handle of the receptacle, and a plate to abut against and hold closed the lid of the receptacle with the receptacle in an inclined transportable position. Mcgreevy does not, however, describe a resilient towing device for towing one or more wheeled receptacles while dampening longitudinal and oscillating forces on the receptacles, further it fails to teach several other advantages and improvements of the present invention.

Australian Patent Office Document No. 2007,100,062 to McManus, describes a device for towing a wheelie bin along the ground by a vehicle fitted with a tow-ball or tow-hook, the wheelie bin, wherein the device comprises a hole allowing engagement with the tow-ball or tow-hook of the vehicle, one or more hooks engaged with the handle bar of the bin with the bin lid closed and when the bin is tilted downwards and forwards. McManus fails to describe, however, a resilient device for towing one or more wheeled bins or receptacles while dampening longitudinal and oscillating forces on the receptacles, further it fails to teach several other advantages and improvements of the present invention.

It is apparent now that numerous innovations for towing one or more wheeled receptacles or bins have been provided in the prior art that are adequate for various purposes. Furthermore, even though these innovations may be suitable for the specific purposes to which they address, accordingly, they would not be suitable for the purposes of the present invention as heretofore described. Thus a resilient towing device for towing one or more trash receptacles while dampening longitudinal and oscillating forces on the trash receptacles is needed. Further, the inexpensive, unitary and simple design of the present invention does not need any bolts, nuts, pins, washers and even skills to attach and detach the device from the receptacle. It is also easy to use, manufacture and transport and requires no maintenance.

SUMMARY OF THE INVENTION

The present invention discloses about a resilient towing device for towing one or more wheeled receptacles while dampening longitudinal and oscillating forces on the receptacles.

Typically, commercially available wheeled trash bins are elongate and upright. The elongate upright profile of the trash receptacle creates a relatively high center of gravity that enables the trash receptacle to be tipped for carrying. Longitudinal and oscillation forces may cause the contents of the trash receptacle to fall out, or the trash receptacle to tip over. The resilient towing device of the present invention connects the one or more wheeled receptacles to a towing vehicle while reducing the longitudinal forces exerted on the receptacle when a momentum of the towing vehicle differs from a momentum of the receptacle.

It is an object of the present invention to provide a resilient towing device for towing one or more receptacles, the device comprising a pair of spaced apart rods comprising a hitch end, a middle region, and a receptacle end, wherein the space between the rods gradually increases from the hitch end towards the receptacle end forming a tapered design to facilitate additional independent lateral and vertical movement for each rod thereby dampening longitudinal and oscillating forces on the receptacle during towing; the pair of rods are substantially parallel at the hitch end and are further configured to join together at the hitch end, the parallel rods at the hitch end continuously run counter along a predetermined length to form a hook, wherein the hook is configured to securely fit a tow hitch ball and prevent the device to detach from a towing vehicle while towing the receptacle, further the hook can be used to connect other hitching surface, such as back of another receptacle; the pair of rods further configured to form a substantially U-shaped support portion at the middle region to support the receptacle handle; and the pair of rods at the receptacle end further configured to form a pair of divergent arcs that extends upwardly and away from the middle region and are configured to pass over an upper edge of the receptacle and press down on the receptacle lid, further each arc comprises a rubber tip to provide smooth contact and additional grip against the receptacle lid; wherein the support portion of the middle region forms a fulcrum support for the receptacle end, allowing the pair of arcs for independent lateral and vertical movement relative to each other for reducing longitudinal and oscillation forces on each of the rods.

It is another object of the present invention to provide a resilient towing device to get connected to a vehicle by a flexible strap, wherein the hook of the device can be joined with the flexible strap by inserting the hook in a strap slot at one end of the strap while the other end of the strap is connected to the vehicle.

Other features and aspects of the invention will become apparent from the following detailed description, taken in conjunction with the accompanying drawings, which illustrate, by way of example, the features in accordance with embodiments of the invention. The summary is not intended to limit the scope of the invention, which is defined solely by the claims attached hereto.

BRIEF DESCRIPTION OF THE DRAWINGS

Illustrative embodiments of the disclosure will now be described, by way of examples, with reference to the accompanying drawings, in which.

Like reference numerals refer to like parts throughout the various views of the drawings.

DETAILED DESCRIPTION OF THE INVENTION

The following detailed description is merely exemplary in nature and is not intended to limit the described embodiments or the application and uses of the described embodiments. As used herein, the word "exemplary" or "illustrative" means "serving as an example, instance, or illustration." Any implementation described herein as "exemplary" or "illustrative" is not necessarily to be construed as preferred or advantageous over other implementations. All of the implementations described below are exemplary implementations provided to enable persons skilled in the art to make or use the embodiments of the disclosure and are not intended to limit the scope of the disclosure, which is defined by the claims. For purposes of description herein, the terms "upper," "lower," "left," "rear," "right," "front," "vertical," "horizontal," and derivatives thereof shall relate to the invention as oriented in FIG. 1. Furthermore, there is no intention to be bound by any expressed or implied theory presented in the preceding technical field, background, brief summary or the following detailed description. It is also to be understood that the specific devices and processes illustrated in the attached drawings, and described in the following specification, are simply exemplary embodiments of the inventive concepts defined in the appended claims. Specific dimensions and other physical characteristics relating to the embodiments disclosed herein are therefore not to be considered as limiting, unless the claims expressly state otherwise.

The present invention discloses a towing device 100 used for towing a receptacle 200 while dampening longitudinal and oscillation forces on the receptacle 200. The device 100 is described in FIGS. 1 through 5. In some embodiments, the device 100 may include a pair of spaced-apart rods 108 that serve to securely connect the receptacle 200 to a towing vehicle 300 while reducing the longitudinal and oscillation forces exerted on the receptacle 200 when a momentum of the towing vehicle 300 differs from a momentum of the receptacle 200. The material composition, tapered design, and orientation of the rods 108 enable independent lateral and vertical movements by each rod 108 that creates the over resilient characteristics of the towing device 100. Additionally, multiple receptacles 200 may be linked together through multiple devices 100 for towing more than one receptacle 200 at one time.

Those skilled in the art will recognize that wheeled trash receptacles 200 have been widely integrated into all segments of waste collection. The wheeled aspect of the trash receptacle 200 is important, as this allows the trash collector to tip the trash receptacle back onto the wheels, and roll it from its usual location to the curb for pick up by a trash collection truck. Typically, commercially available wheeled trash bins 200 are elongate and upright. The wheels are positioned at what is considered the back side of the trash receptacle 200, and the lid has a hinged connection and a handle 202 by which to move the trash receptacle 200, as a whole, at the back.

It is known in the art that the elongate upright profile of the trash receptacle 200 generally is one that creates a relatively high center of gravity that enables the trash receptacle 200 to be tipped for carrying. Often, the contents of the trash receptacle 200 are too heavy to pull. Additionally, multiple trash receptacles 200 may require towing. This operation can be too cumbersome for one person. In many instances, a vehicle 300 with a hitch 302 can be used. Unfortunately, longitudinal and oscillation forces may cause the contents of the trash receptacle 200 to fall out, or the generally elongated trash receptacle 200 to tip over. In such instances, it would be advantageous to have a simple towing connection that could be utilized to tow the trash receptacle 200 behind the vehicle 300 while also dampening longitudinal and oscillating forces acting on the trash receptacle 200.

Figure 1:
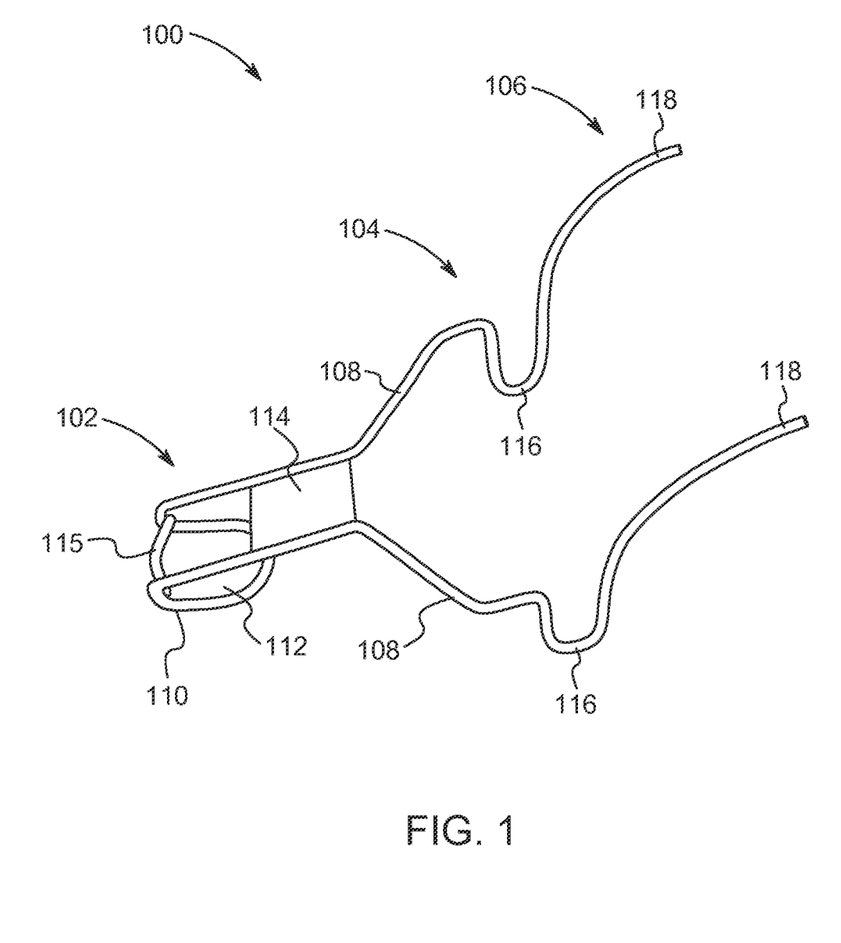
FIG. 1 is a perspective top view of a resilient towing device having a hitch end, a middle region, and a receptacle end in accordance with an embodiment of the present invention.

As referenced in FIG. 1, the pair of rods 108 of the resilient towing device 100 has a hitch end 102, a middle region 104, and a receptacle end 106. The pair of rods 108 are configured for independent lateral and vertical movement relative to each other; thereby forming resilient characteristics that are efficacious for dampening longitudinal and oscillating forces, such as vibrations, jerks, and abrupt tugging motions. The resiliency is a result of the composition and orientation of the rods 108. For example, without limitation, the rods 108 may include a malleable metal composition that flexes in response to the longitudinal and oscillation forces. Additionally, the space between the rods 108 increases from the hitch end 102 towards the receptacle end 106. This widening space creates additional independent lateral and vertical movement for each rod 108.

In some embodiments, the rods 108 may join together at a hitch end 102. The hitch end 102 forms a hook 110 having an opening 112. The hook 110 and/or the opening 112 may be used to hitch on to the towing vehicle 300. A middle region 104 includes a support portion 116 that may be used to support a receptacle handle 202 during towing. A receptacle end 106 of the rods 108 forms a pair of arcs 118 that extends upwardly and away from the middle region 104. The pair of arcs 118 are configured to pass over an upper edge of the receptacle 200 and press down on a receptacle lid 204. In this manner, the support portion 116 forms a fulcrum of support for the receptacle end 106. In one embodiment, a strap 400 may serve as a connector between the hitch end 102 and the towing vehicle 300.

In one aspect of the present invention, a resilient towing device 100 for towing one or more receptacles 200, the device 100 comprising:

a pair of spaced apart rods 108 comprising a hitch end 102, a middle region 104, and a receptacle end 106, wherein the space between the rods 108 gradually increases from the hitch end 102 towards the receptacle end 106 forming a tapered design;

the pair of rods 108 further configured to join together at the hitch end 102, the hitch end 102 configured to form a hook 110, the hook comprising an opening 112, which facilitates the device 100 to hitch on to a towing vehicle 300 or on to back of another receptacle 200;

the pair of rods 108 further configured to form a substantially U-shaped support portion 116 at the middle region 104 to support the receptacle handle 202; and the pair of rods 108 at the receptacle end 106 further configured to form a pair of divergent arcs 118 that extends upwardly and away from the middle region 104 and are configured to pass over an upper edge of the receptacle 200 and press down on the receptacle lid 204, wherein the support portion 116 of the middle region 104 is configured to form a fulcrum support for the receptacle end 106, allowing the pair of arcs 118 for independent lateral and vertical movement relative to each other for reducing longitudinal and oscillation forces on each of the rods 108.

In yet another aspect of the present invention, the pair of rods 108 at the hitch end 102 is substantially parallel to each other.

In yet another aspect of the present invention, the pair of rods 108 further configured to join together at top surface of the hitch end 102 by a bar or a sheet metal 114 to enhance stability at the hitch end 102, further the sheet 114 may be used as a surface for representing a logo or other information on it.

In yet another aspect of the present invention, the pair of rods 108 further configured to join together at one end of the hook by a rod 115 to act as a lock for the tow hitch ball 302 so as to prevent the device 100 to detach from the towing vehicle 300 while towing the receptacle 200.

In yet another aspect of the present invention, the hook 110 can be joined with a strap 400 by inserting the hook in a strap slot 402 at one end 404 of the strap 400 while the other end 406 of the strap 400 is connected to the towing vehicle 300, wherein the strap 400 is made from materials including rubber that is tied down by fabric materials, nylon, and synthetic fibers, wherein the strap material is be sufficiently flexible to stretch, bend and fold.

In yet another aspect of the present invention, the tapered design of the device 100 facilitates additional independent lateral and vertical movement for each rod 108, thereby dampening longitudinal and oscillating forces on the receptacle 200 during towing.

In yet another aspect of the present invention, the rods 108 of the device 100 made from materials including aluminum, steel, metal alloys, semi-rigid polymers, polyurethane, polyvinyl chloride, and wood, wherein the material composition of the rods 108 enhances free movement for each rod 108, independent of the other.

In yet another aspect of the present invention, each arc 118 comprises a rubber tip 120 to provide smooth contact and additional grip against the receptacle lid 204.

In yet another aspect of the present invention, a resilient towing device 100 for towing one or more receptacles 200, the device 100 comprising:

a pair of spaced apart rods 108 comprising a hitch end 102, a middle region 104, and a receptacle end 106, wherein the space between the rods 108 gradually increases from the hitch end 102 towards the receptacle end 106 forming a tapered design to facilitate additional independent lateral and vertical movement for each rod 108 thereby dampening longitudinal and oscillating forces on the receptacle 200 during towing;

the pair of rods 108 are substantially parallel at the hitch end 102 and are further configured to join together at the hitch end 102, the parallel rods 108 at the hitch end 102 continuously run counter along a predetermined length to form a hook 110, wherein the hook 110 is configured to securely fit a tow hitch ball 302 and prevent the device 100 to detach from a towing vehicle 300 while towing the receptacle 200, further the hook 110 can be used to connect other hitching surface, such as back of another receptacle 200;

the pair of rods 108 further configured to form a substantially U-shaped support portion 116 at the middle region 104 to support the receptacle handle 202; and the pair of rods 108 at the receptacle end 106 further configured to form a pair of divergent arcs 118 that extends upwardly and away from the middle region 104 and are configured to pass over an upper edge of the receptacle 200 and press down on the receptacle lid 204; wherein the support portion 116 of the middle region 104 forms a fulcrum support for the receptacle end 106, allowing the pair of arcs 118 for independent lateral and vertical movement relative to each other for reducing longitudinal and oscillation forces on each of the rods 108.

In yet another aspect of the present invention, a resilient towing device 100 for towing one or more receptacles 200, the device 100 comprising:

a pair of spaced apart rods 108 comprising a hitch end 102, a middle region 106, and a receptacle end 108, wherein the space between the rods 108 gradually increases from the hitch end 102 towards the receptacle end 106 forming a tapered design to facilitate additional independent lateral and vertical movement for each rod 108 thereby dampening longitudinal and oscillating forces on the receptacle 200 during towing;

the pair of rods 108 are substantially parallel at the hitch end 102 and are further configured to join together at the hitch end 102, the parallel rods 108 at the hitch end 102 continuously run counter along a predetermined length to form a hook 110, wherein the hook 110 is connected to a strap 400 at one end 404 while the other end 406 of the strap 400 is connected to the towing vehicle 300, further the hook 110 can be connected to other surface, such as back of another receptacle 200;

the pair of rods 108 further configured to form a substantially U-shaped support portion 116 at the middle region 104 to support the receptacle handle 202; and the pair of rods 108 at the receptacle end 106 further configured to form a pair of divergent arcs 118 that extends upwardly and away from the middle region 104 and are configured to pass over an upper edge of the receptacle 200 and press down on the receptacle lid 204; wherein the support portion 116 of the middle region 104 forms a fulcrum support for the receptacle end 106, allowing the pair of arcs 118 for independent lateral and vertical movement relative to each other for reducing longitudinal and oscillation forces on each of the rods 108.

FIG. 1 illustrates a perspective view of the resilient towing device 100. The device 100 comprises a pair of spaced-apart rods 108. The rods 108 have a hitch end 102, a middle region 104, and a receptacle end 106. The pair of rods 108 are configured for independent lateral and vertical movement relative to each other; thereby forming resilient characteristics that are efficacious for dampening longitudinal forces, such as vibrations, jerks, and abrupt tugging motions. The rods 108 are spaced apart and substantially parallel to each other at the hitch end 102 and space between the rods 108 generally increases from the hitch end 102 to the receptacle end 106 to create additional independent lateral and vertical movement for each rod 108. The material composition of the rods 108 also enhances free movement for each rod 108, independent of the other. Suitable materials for the rods 108 may include, without limitation, aluminum, steel, metal alloys, semi-rigid polymers, polyurethane, polyvinyl chloride, and wood.

Figure 2:
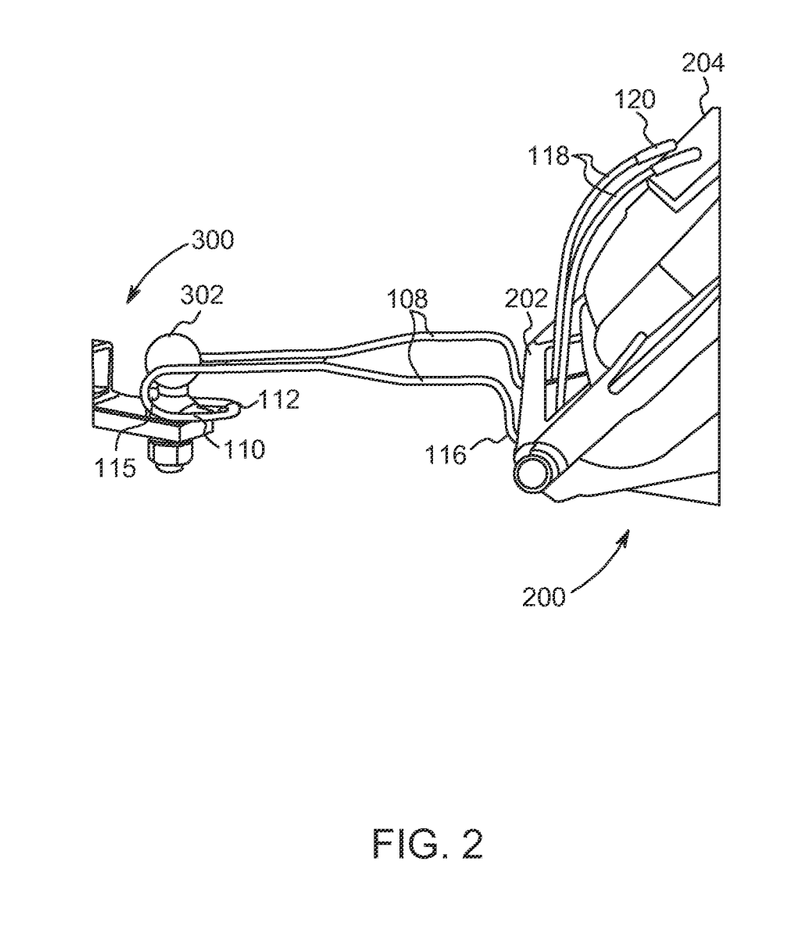
FIG. 2 is a perspective side view of the resilient towing device connecting an exemplary towing vehicle and an exemplary receptacle, according to an illustrative embodiment of present invention.

Turning now to FIG. 2, the rods 108 may join together at a hitch end 102. The hitch end 102 forms a hook 110 having an opening 112. The hook 110 and/or the opening 112 may be used to hitch on to a tow hitch or tow hitch ball 302 from a towing vehicle 300. The hook 110 may run counter to, and parallel to the rods 108 along a portion of the length of the device 100. In this manner, the hook 110 forms a surface for grasping the tow hitch 302 or other hitching surface. The space between the rods 108 in the hook 110 forms an opening 112 that enables passage of the tow hitch 302, further the pair of rods 108 configured to join together at one end of the hook 110 by a rod 115 to act as a lock for the tow hitch ball 302 so as to prevent the device 100 to detach from the towing vehicle 300 while towing the receptacle 200. The pair of rods 108 further configured to join together at top surface of the hitch end 102 by a bar or a sheet metal 114 to enhance stability at the hitch end 102; further the sheet 114 may be used as a surface for representing a logo or other information on it.

In some embodiments, a middle region 104 includes a support portion 116 that may be used to support a receptacle handle 202 for the receptacle 200. The support portion 116 configured to form a U-shape that is sized and dimensioned to receive and support the receptacle handle 202, which is often found in standard wheeled trash receptacles 200. In some embodiments, a receptacle end 106 of the rods 108 forms a pair of arcs 118 that extends upwardly and away from the middle region 104. The pair of arcs 118 is configured to pass over the upper edge of the receptacle 200 and press down on a receptacle lid 204. In this manner, the pair of arcs 118 press down on the receptacle lid 204 during towing to inhibit the receptacle lid 204 from disengaging from the receptacle 200. Additionally, the support portion 116 forms a fulcrum of support for the receptacle end 106 to maintain a counter balancing force on the arcs 118. In some embodiments, each arc 118 may have a rubber tip 120 to provide smooth contact surface and additional grip against the receptacle lid 204.

Figure 3:
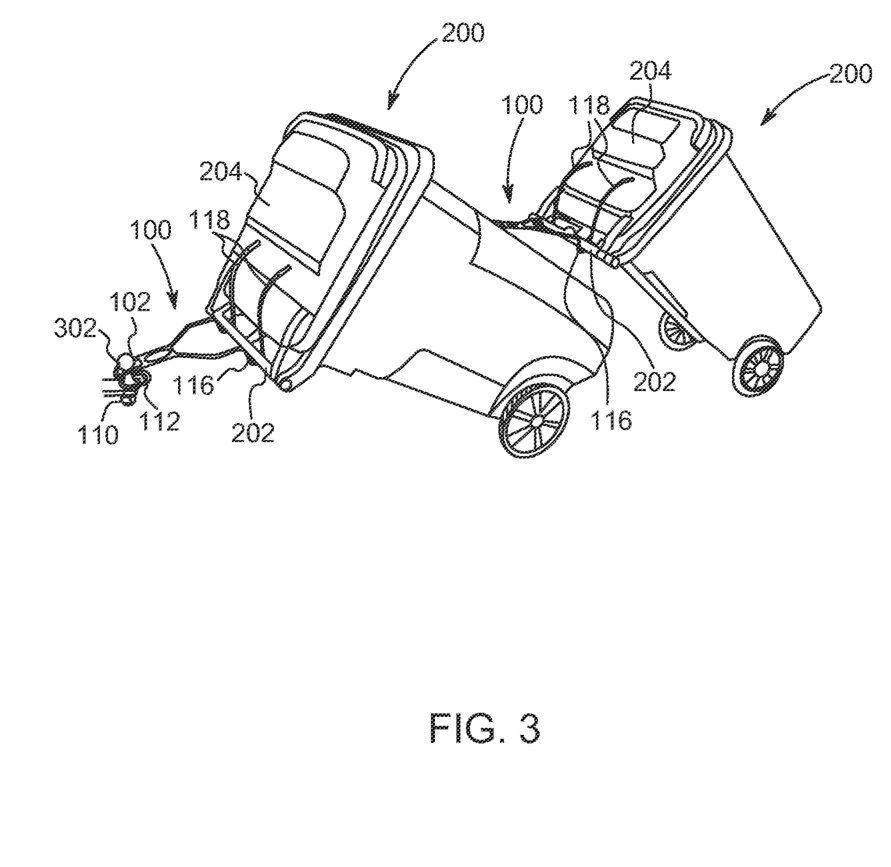
FIG. 3 is a perspective view of multiple receptacles connected through the resilient towing devices, according to an illustrative embodiment of the present invention.

In another embodiment of the present invention, FIG. 3 illustrates multiple receptacles 200 connected through the device 100. In this manner, a towing vehicle 300 can tow multiple receptacles 200 at one time. While used to pull multiple receptacles 200, the hitch end 102 connects to a receptacle hitch ball (not shown) on a rear side of the receptacle 200, otherwise the hook 110 (not shown) can be used to connect to the rear side of the receptacle 200. The middle region 104 and the receptacle end 106 of the rods 108 support the receptacle 200 in much the same way as when the towing vehicle 300 is towing only one receptacle 200. The pair of rods 108 have sufficient resiliency to enable turning around tight corners, even when multiple receptacles 200 are being towed.

Figure 4:
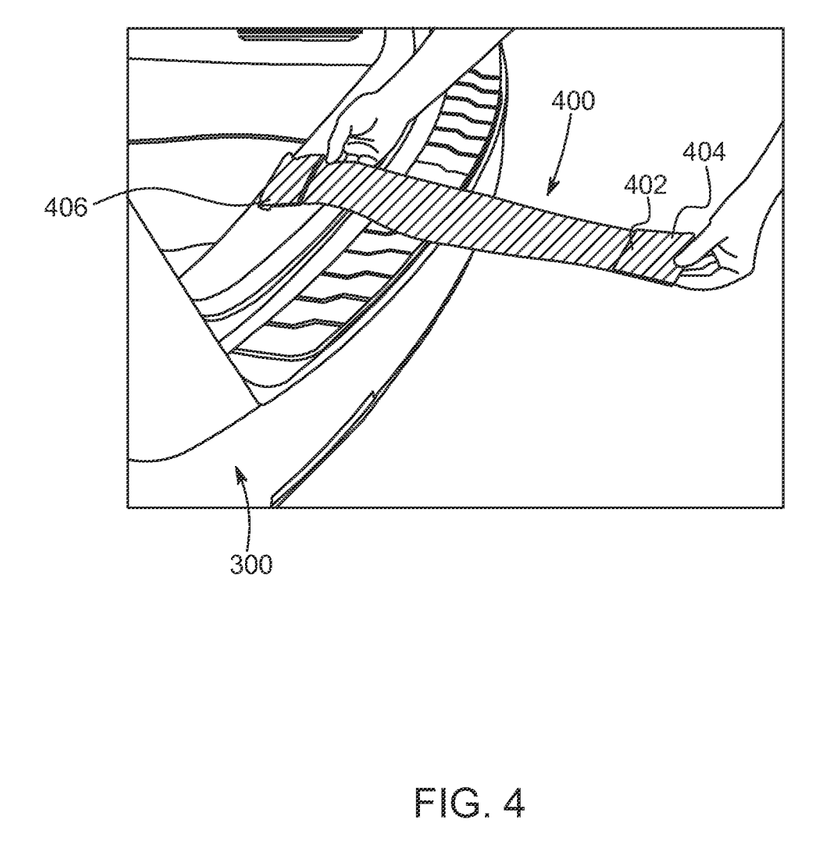
FIG. 4 is a top perspective view of an exemplary strap adapted to connect the towing vehicle to the resilient towing device, according to an illustrative embodiment of the present invention.

FIG. 4 is a top perspective view of an exemplary strap 400, adapted to connect the towing vehicle 300 to the resilient towing device 100. In one embodiment, the strap 400 may serve as a connector between the hitch end 102 and the towing vehicle 300. The strap 400 comprises a strap slot 402, a first end 404, and a second end 406. The hook 110 from the hitch end 102 engages the strap slot 402 at the first end 404, while a towing vehicle 300 joins with the second end 406. The strap 400 may be sufficiently flexible to stretch, bend, and fold. Suitable materials for the strap 400 may include, without limitation, rubber that is tied down by fabric materials, nylon, and synthetic fibers.

Figure 5:
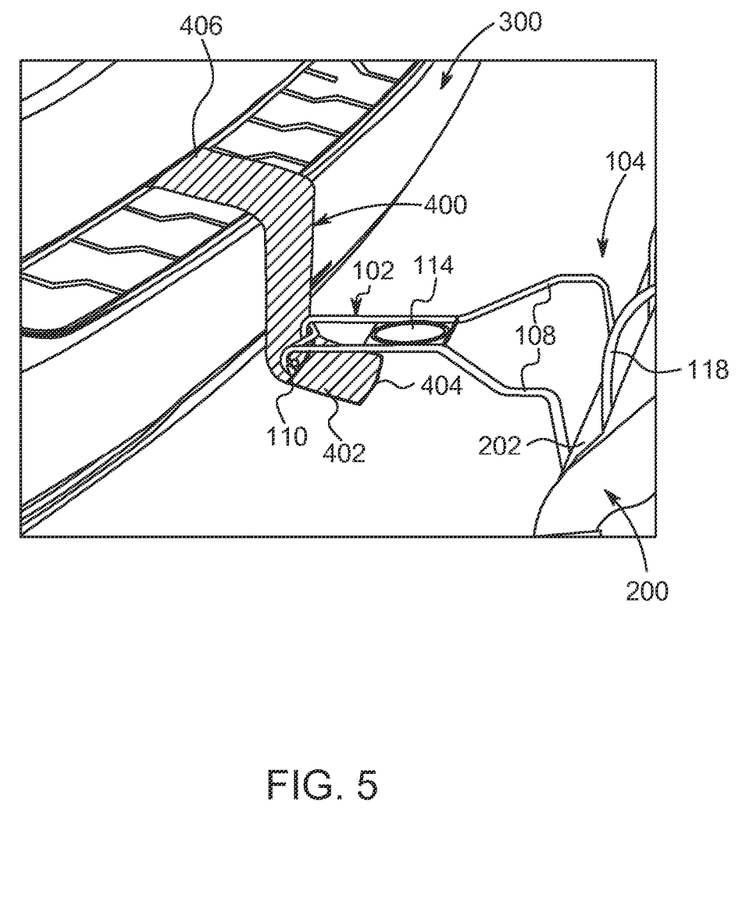
FIG. 5 is a top perspective view of the strap joined at a first end with the hook at the hitch end through an exemplary strap slot, and joined at a second end with a closed hatch door of the towing vehicle, according to an illustrative embodiment of the present invention.

FIG. 5 illustrates the strap 400 joined at a first end 404 with the hitch end 102 through an exemplary strap slot 402. The strap slot 402 is sized and dimensioned to receive the hook 110 from the hitch end 102. The strap 400 may be joined at a second end 406 with the towing vehicle 300 through a variety of possible hitching means. The second end 406 may also have a strap slot 402 in some embodiments. The strap 400 comprises a material that is even more flexible and resilient than the pair of rods 108, which may be advantageous for turning tight corners, storage, and adaptability to different towing vehicles 300. For example, without limitation, a hatch door on the towing vehicle 300 can close on the second end 406 of the strap 400 to form a connection. This type of simple connection may not be possible with the more rigid rods 108, which require a more structured surface to hitch.

In yet another embodiment of the invention instead of two spaced apart rods 108 three or more spaced apart rods 108 can be used to make the tapered design of the device 100. Several other modifications and alterations can be made to the present invention without departing from the scope and spirit of the present invention.

One advantage of the present invention is that the receptacle 200 can be towed with minimal longitudinal and oscillation forces exerted on the receptacle 200 when a momentum of the towing vehicle 300 differs from a momentum of the receptacle 200.

Another advantage is that the hitch end 102 easily connects to a standard tow hitch ball 302 used on most towing vehicles 300.

Yet another advantage is that the receptacle end 106 easily connects to a standard receptacle handle 202 used for most wheeled trash receptacles.

Yet another advantage is that the pair of arcs 118 press down on the receptacle lid 204 during towing to restrict the receptacle lid 204 from disengaging from the receptacle 200.

Yet another advantage is that multiple receptacles 200 can be towed by linking them together with multiple devices 100.

Yet another advantage is that the towing device 100 is easily manufactured and sufficiently resilient, facilitating compact storage and shipping.

Yet another advantage is that the towing device 100 is inexpensive, unitary and simple design facilitating its quick attachment and detachment.

Yet another advantage is that the towing device 100 does not need any bolts, nuts, pins, washers and even skills to attach and detach the device from the receptacle.

Yet another advantage is that the towing device 100 can be used with personal vehicles which even do not have a tow hitch ball mount 302.

Yet another advantage is that the towing device 100 requires no maintenance at all.

Because many modifications, variations, and changes in detail can be made to the described preferred embodiments of the invention, it is intended that all matters in the foregoing description and shown in the accompanying drawings be interpreted as illustrative and not in a limiting sense. Thus, the scope of the invention should be determined by the appended claims and their legal equivalence.

What is claimed is:

1. A resilient towing device for towing one or more receptacles, the device comprising:
   a pair of spaced apart rods comprising a hitch end, a middle region, and a receptacle end, wherein the space between the rods gradually increases from the hitch end towards the receptacle end forming a tapered design;
   the pair of rods further configured to join together at the hitch end, the hitch end configured to form a hook, the hook comprising an opening, which facilitates the device to hitch on to a towing vehicle or on to back of another receptacle;
   the pair of rods further configured to form a substantially U-shaped support portion at the middle region to support the receptacle handle; and
   the pair of rods at the receptacle end further configured to form a pair of divergent arcs that extends upwardly and away from the middle region and are configured to pass over an upper edge of the receptacle and press down on the receptacle lid, wherein the support portion of the middle region is configured to form a fulcrum support for the receptacle end, allowing the pair of arcs for independent lateral and vertical movement relative to each other for reducing longitudinal and oscillation forces on each of the rods.

2. The device of claim 1, wherein the pair of rods at the hitch end are substantially parallel to each other.

3. The device of claim 1, wherein the pair of rods further configured to join together at top surface of the hitch end by a bar or a sheet metal to enhance stability at the hitch end, further the sheet may be used as a surface for representing a logo or other information on it.

4. The device of claim 1, wherein the pair of rods further configured to join together at one end of the hook by a rod to act as a lock for the tow hitch ball so as to prevent the device to detach from the towing vehicle while towing the receptacle.

5. The device of claim 1, wherein the hook can be joined with a strap by inserting the hook in a strap slot at one end of the strap while the other end of the strap is connected to the towing vehicle, wherein the strap is made from materials including rubber that is tied down by fabric materials, nylon, and synthetic fibers, wherein the strap material is be sufficiently flexible to stretch, bend and fold.

6. The device of claim 1, wherein the tapered design of the device facilitates additional independent lateral and vertical movement for each rod, thereby dampening longitudinal and oscillating forces on the receptacle during towing.

7. The device of claim 1, wherein the rods of the device made from materials including aluminum, steel, metal alloys, semi-rigid polymers, polyurethane, polyvinyl chloride, and wood, wherein the material composition of the rods enhances free movement for each rod, independent of the other.

8. The device of claim 1, wherein each arc comprises a rubber tip to provide smooth contact and additional grip against the receptacle lid.

9. A resilient towing device for towing one or more receptacles, the device comprising:
   a pair of spaced apart rods comprising a hitch end, a middle region, and a receptacle end, wherein the space between the rods gradually increases from the hitch end towards the receptacle end forming a tapered design to facilitate additional independent lateral and vertical movement for each rod thereby dampening longitudinal and oscillating forces on the receptacle during towing;
   the pair of rods are substantially parallel at the hitch end and are further configured to join together at the hitch end, the parallel rods at the hitch end continuously run counter along a predetermined length to form a hook, wherein the hook is configured to securely fit a tow hitch ball and prevent the device to detach from a towing vehicle while towing the receptacle, further the hook can be used to connect other hitching surface, such as back of another receptacle;
   the pair of rods further configured to form a substantially U-shaped support portion at the middle region to support the receptacle handle; and
   the pair of rods at the receptacle end further configured to form a pair of divergent arcs that extends upwardly and away from the middle region and are configured to pass over an upper edge of the receptacle and press down on the receptacle lid; wherein the support portion of the middle region forms a fulcrum support for the receptacle end, allowing the pair of arcs for independent lateral and vertical movement relative to each other for reducing longitudinal and oscillation forces on each of the rods.

10. The device of claim 9, wherein the pair of rods further configured to join together at top surface of the hitch end by a bar or a sheet metal to enhance stability at the hitch end, further the sheet may be used as a surface for representing a logo or other information on it.

11. The device of claim 9, wherein the pair of rods further configured to join together at one end of the hook by a rod to act as a lock for the tow hitch ball so as to prevent the device to detach from the towing vehicle while towing the receptacle.

12. The device of claim 9, wherein the hook can be joined with a flexible strap by inserting the hook in a strap slot at one end of the strap while the other end of the strap is connected to the towing vehicle.

13. The device of claim 9, wherein the rods of the device made from materials including aluminum, steel, metal alloys, semi-rigid polymers, polyurethane, polyvinyl chloride, and wood, wherein the material composition of the rods enhances free movement for each rod, independent of the other.

14. The device of claim 9, wherein each arc comprises a rubber tip to provide smooth contact and additional grip against the receptacle lid.

15. A resilient towing device for towing one or more receptacles, the device comprising:

a pair of spaced apart rods comprising a hitch end, a middle region, and a receptacle end, wherein the space between the rods gradually increases from the hitch end towards the receptacle end forming a tapered design to facilitate additional independent lateral and vertical movement for each rod thereby dampening longitudinal and oscillating forces on the receptacle during towing;

the pair of rods are substantially parallel at the hitch end and are further configured to join together at the hitch end, the parallel rods at the hitch end continuously run counter along a predetermined length to form a hook, wherein the hook is connected to a strap at one end while the other end of the strap is connected to the towing vehicle, further the hook can be connected to other surface, such as back of another receptacle;

the pair of rods further configured to form a substantially U-shaped support portion at the middle region to support the receptacle handle; and the pair of rods at the receptacle end further configured to form a pair of divergent arcs that extends upwardly and away from the middle region and are configured to pass over an upper edge of the receptacle and press down on the receptacle lid; wherein the support portion of the middle region forms a fulcrum support for the receptacle end, allowing the pair of arcs for independent lateral and vertical movement relative to each other for reducing longitudinal and oscillation forces on each of the rods.

16. The device of claim 15, wherein the pair of rods further configured to join together at top surface of the hitch end by a bar or a sheet metal to enhance stability at the hitch end, further the sheet may be used as a surface for representing a logo or other information on it.

17. The device of claim 15, wherein the hook is configured to securely fit a tow hitch ball and prevent the device to detach from a towing vehicle while towing the receptacle.

18. The device of claim 15, wherein the rods of the device made from materials including aluminum, steel, metal alloys, semi-rigid polymers, polyurethane, polyvinyl chloride, and wood, wherein the material composition of the rods enhances free movement for each rod, independent of the other.

19. The device of claim 15, wherein each arc comprises a rubber tip to provide smooth contact and additional grip against the receptacle lid.

20. The device of claim 15, wherein the strap is made from materials including rubber that is tied down by fabric materials, nylon, and synthetic fibers, wherein the strap material is be sufficiently flexible to stretch, bend and fold.

* * * * *